(12) United States Patent
Tahiri et al.

(10) Patent No.: US 11,973,850 B2
(45) Date of Patent: Apr. 30, 2024

(54) SYSTEM AND METHOD FOR AUTOMATIC DEPLOYMENT OF A CLOUD ENVIRONMENT

(71) Applicant: ATOS IT SERVICES UK LIMITED, London (GB)

(72) Inventors: Adil Tahiri, Diss (GB); Babak Seddigh Tehran, Ruislip (GB); Adam Dolman, London (GB)

(73) Assignee: AGARIK SAS, Saint-Ouen (FR)

( * ) Notice: Subject to any disclaimer, the term of this patent is extended or adjusted under 35 U.S.C. 154(b) by 162 days.

(21) Appl. No.: 17/357,878

(22) Filed: Jun. 24, 2021

(65) Prior Publication Data

US 2021/0405988 A1 Dec. 30, 2021

(30) Foreign Application Priority Data

Jun. 26, 2020 (EP) ..................... 20182700

(51) Int. Cl.
*H04L 67/75* (2022.01)
*G06F 8/60* (2018.01)
*H04L 67/10* (2022.01)
*G06F 8/61* (2018.01)
*G06F 8/71* (2018.01)

(52) U.S. Cl.
CPC ............. *H04L 67/75* (2022.05); *G06F 8/60* (2013.01); *H04L 67/10* (2013.01); *G06F 8/61* (2013.01); *G06F 8/71* (2013.01)

(58) Field of Classification Search
CPC . H04L 67/75; H04L 67/10; G06F 8/60; G06F 8/61
See application file for complete search history.

(56) References Cited

U.S. PATENT DOCUMENTS 9,614,781 B1 4/2017 Goltzman et al.
9,858,060 B2 1/2018 Barros et al.
(Continued)

OTHER PUBLICATIONS

European Search Report issued in EP20182700, dated Dec. 18, 2020, 12 pages.

*Primary Examiner* — Hua Fan
(74) *Attorney, Agent, or Firm* — ARC IP Law, PC; Joseph J. Mayo

(57) ABSTRACT

A method for the rapid, automatic, and adaptative deployment of a cloud environment that is secure, that adapts to different hardware architectures, network architectures, cloud services, technologies, and user needs, and that requires minimal user input. Configuration data may be generated for a collection of software components, which may include user inputs and randomly generated data. This data may be stored in a configuration database that is updated as deployment proceeds. Available hardware such as servers, storage, and networks may be discovered automatically and added to the configuration database. An initial software component may be deployed to coordinate subsequent steps, and then additional software components may be deployed in a sequence that considers dependencies. Software components may be organized into deployment groups. Users may select subsets of the components to deploy. The deployed cloud environment may be tested and validated automatically.

14 Claims, 2 Drawing Sheets

(56) References Cited

U.S. PATENT DOCUMENTS

| | | | |
|---|---|---|---|
| 2009/0328154 A1* | 12/2009 | Field | G06F 21/46 |
| | | | 726/4 |
| 2016/0150411 A1* | 5/2016 | Liu | H04L 63/0853 |
| | | | 726/4 |
| 2018/0097914 A1* | 4/2018 | Olderdissen | H04L 67/01 |
| 2018/0159701 A1* | 6/2018 | Krause | H04L 61/2514 |

* cited by examiner

SYSTEM AND METHOD FOR AUTOMATIC DEPLOYMENT OF A CLOUD ENVIRONMENT

This application claims foreign priority to European Patent Application No. 20182700.3 filed on Jun. 26, 2020, the specification of which is hereby incorporated herein by reference.

BACKGROUND OF THE INVENTION

Field of the Invention

The field of the invention is cloud computing. More particularly, but not by way of limitation, one or more embodiments of the invention enable a system and method for the automatic deployment of a cloud computing environment.

Description of the Related Art

With the development of cloud computing use across large organizations, different cloud services and technologies have developed. Business units, or departments of the same company or entity have different needs regarding cloud use, whether in terms of security, performances, location, capacity etc. That is why cloud environments deployed across large organization are often heterogeneous regarding the cloud services and technologies implemented. Therefore, many different cloud services can cohabit in the same organization, such as for example Platform as a Service ("Paas"), Software as a Service ("SaaS"), Infrastructure as a Service ("IaaS"). Many different technologies can also cohabit, for example virtual machines (operating systems running on a single or on a plurality of machines for use by a plurality of users), bare metal servers (single-tenant physical servers), containers (softwares packaged in images, to run in an isolated environment), and even in the use of Virtual Machines ("VM"), different operating systems such as Windows and Linux can be used, in the use of hypervisors, different types of hypervisors such as hosted hypervisors or native hypervisors can be used on different types of hardware. For example, to deploy micro-service-based applications, containers, PaaS and serverless technologies can be used.

In a cloud environment, different processors, operating systems, software and other components are deployed to create virtual machine that are then used alone or in combination to run software and/or to perform tasks.

The deployment of such cloud environments usually takes weeks, mainly because it is needed to take into account the different needs and possibilities of the different actors of the organizations, and because the existing information technology systems are not homogenous. Because of this heterogeneity, technology possibilities are limited and the deployment of such cloud environments to be used by such systems must take into account said limitations.

Cloud deployment further depends on the location of deployment and on provided data, where the data for example represents existing network configurations, hardware configurations etc.

Existing automated deployment methods retrieve said provided data and automate some of the processes that can lead to the deployment of a cloud environment. These methods have restrictions regarding the provided data, the hardware architecture and the services it can deploy. Furthermore, the methods require someone to provide the data and to access the data to modify it in the event of a change in hardware, network etc.

There is therefore a need for a solution to enable a rapid, automatic and adaptative deployment of an entire cloud environment that is secure, that adapts to different hardware architecture, network architectures, cloud services, technologies and user needs, and that is easy to use.

BRIEF SUMMARY OF THE INVENTION

One or more embodiments of the invention solve the above-mentioned problems by providing a solution able to deploy automatically and rapidly an entire cloud environment with limited user input and without further interaction from the user.

According to a first aspect of the invention, this is satisfied by providing a method for the deployment of a cloud environment, the cloud environment comprising a plurality of software components and being deployed through at least one network, the method being characterized in that it comprises the steps of:

- Retrieving a plurality of user pieces of data related to the cloud environment from at least one user using at least one user interface,
- Storing the retrieved user pieces of data in a configuration management database,
- Generating data related to the plurality of software components and to at least one network host to host at least part of the plurality of software components, at least part of the generated data being generated randomly,
- Storing the generated data in the configuration management database,
- Retrieving data related to a software component of the plurality of software components of the cloud environment from the configuration management database, the data comprising at least one piece of data from the user data and/or the generated data and at least one piece of installation data,
- Deploying the software component using the retrieved data related to the software component, the deploying comprising at least the installation and configuration of the software component and generating deployment data related to the deployment of the software component,
- Storing the deployment data in the configuration management database,
- For each other software component of the plurality of software components of the cloud environment:
  - Retrieving data related to the software component from the configuration management database, the data comprising at least one piece of data from user data, generated data and/or deployment data and at least one piece of data of installation data,
  - Deploying the software component using the retrieved data related to the software component, the deploying comprising at least the installation and configuration of the software component and generating new deployment data related to the deployment of the software component
  - Storing in the configuration management database the new deployment data along previously stored deployment data.

In one or more embodiments of the invention, a method for automatic cloud deployment is provided with limited user interaction as compared to known solutions of the state of the art. This method may be automatic in that it deploys a fully working cloud environment from scratch, that is from a "bare metal" server with very limited user interaction. Indeed, the method only requires a limited amount of input from a user. From this limited input, the method is able to generate data, at least part of it being generated randomly, which decreases the need in user input and which increases the security of the cloud environment. Indeed, the generated data is generated automatically and randomly which means it is not known by any user which makes the cloud environment more opaque and therefore harder to penetrate maliciously.

Further, in one or more embodiments of the invention, the generated and retrieved data are used at each step of the deployment and are enhanced and become larger as the deployment is carried out, thanks to the presence of a configuration management database. Such database is accessible at each step, both in reading and in writing which permits to have always accessible data which improves with the deployment. Therefore, the software components deployed the latest benefit from and can use deployment data of previously deployed software components. This permit to keep the method automatic and rapid, by always growing the configuration management database and starting from a low amount of user input.

The method according to the first aspect of the invention may also have one or more of the following characteristics, considered individually or according to any technically possible combinations thereof:
- The method comprises a step of performing a hardware discovery through the network to obtain data related to the network host prior to the step of generating data related to the network host.
- the software components are grouped in deployment groups and the deployment groups are deployed at the deploying step.
- the software components are grouped in deployment groups as a function of their types.
- the software components are selected from virtual machine components, hypervisor components, software defined storage components, network components, security components, deployment components.
- the data related to the network host comprises at least one of IP address of the host and hostname.
- the user data comprises at least one piece of data related to location, subnet, network services, hardware, security.
- the method further comprises a step of creating a global configuration of the cloud environment, after the step of retrieving user data, based on the retrieved user data, the global configuration being used by an orchestrator in a further step of selecting which software components to deploy among the plurality software components of the cloud environment and a further step of defining a deployment sequence of the selected software components.
- the method further comprises a step of validating the user data after the step of retrieving user data, the step of validating user data comprising checking that user data verifies predefined rules and correcting parts of user data that do not verify predefined rules.
- the method further comprises a step of testing the deployed cloud environment comprising the deployed software components, the step of testing comprising checking that the deployment verifies predefined rules.

The automatic validating permits to again lower the need in user input, by checking the retrieved user data against predefined rules. The software components can be grouped to improve the deployment time and efficiency.

Further, the possible software components are downselected to match the retrieved user data which permits to adapt easily to the user needs and having a quicker deployment method. Thanks to the presence of an orchestrator, the software components are deployed in an efficient and accurate order, taking into account the dependencies between software components and optimizing the deployment time.

Another aspect of one or more embodiments of the invention relates to a system for the deployment of a cloud environment, the cloud environment comprising a plurality of software components, the system being configured to carry out the method according to one or more embodiments of the invention, the system comprising:
- At least one user interface, configured to carry out the step of retrieving a plurality of user pieces of data
- At least one orchestrator, configured to define a sequence of deployment of the software components,
- At least one processor, configured to carry out the steps of generating data, of deploying the software components, and of retrieving deployment data,
- At least one configuration management database, configured to carry out the steps of storing user data, generated data and deployment data.

The method according to the other aspect of one or more embodiments of the invention may also have one or more of the following characteristics, considered individually or according to any technically possible combinations thereof:
- the processor is further configured to carry out the step of validating user data.
- the orchestrator is further configured to carry out the step of selecting, based on the retrieved user data, which software components to deploy among the plurality software components of the cloud environment.

Another aspect of one or more embodiments of the invention relates to a computer program product comprising instructions which, when the program is executed by a computer, causes the computer to carry out the method according to one or more embodiments of the invention.

Another aspect of one or more embodiments of the invention relates to a computer-readable medium comprising instructions which, when executed by a computer, cause the computer to carry out any the method according to the invention.

One or more embodiments of the invention may find a particular interest when deploying a cloud environment with heavy time constraints and limited manpower, as it is automatic and rapid and does not require significant, detailed and/or too technical user input.

BRIEF DESCRIPTION OF THE DRAWINGS

Other characteristics and advantages of the invention will become clear from the description that is given thereof below, by way of indication and in no way limiting, with reference to the following figures, wherein.

DETAILED DESCRIPTION OF THE INVENTION

For greater clarity, identical or similar elements are marked by identical reference signs in all of the figures.

Figure 1:
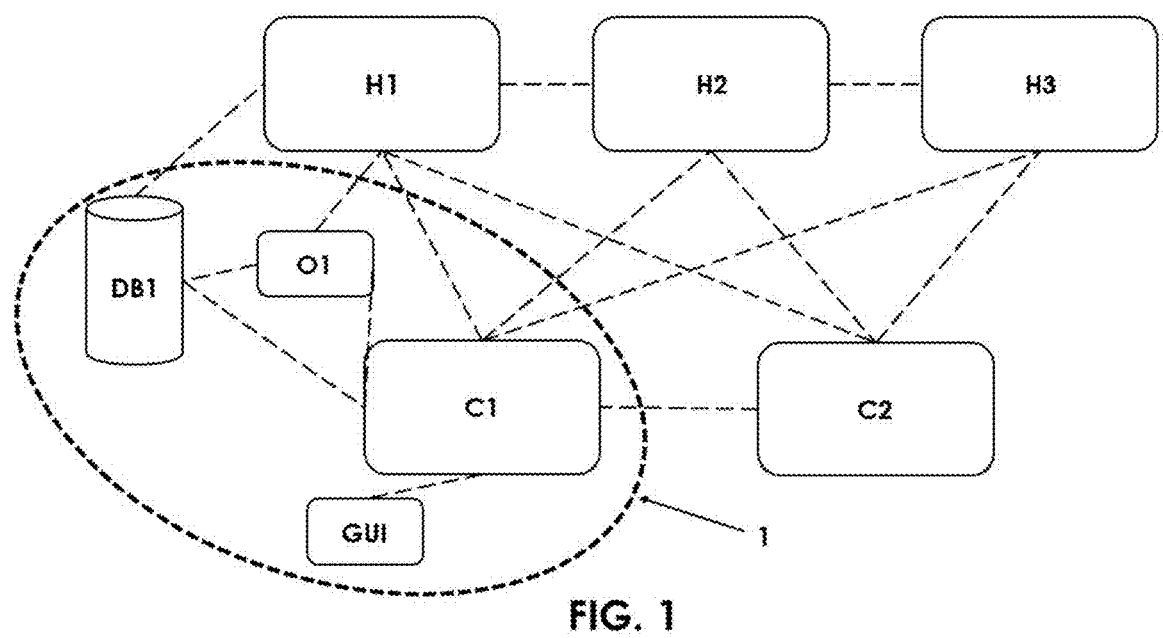
FIG. 1 is a schematic representation of a cloud deployment system according to one or more embodiments of the invention.

FIG. 1 presents the cloud deployment system 1 implementing the methods according to one or more embodiments of the invention. The cloud deployment system 1 comprises a processor, an orchestrator O1, a configuration management database DB1 and a user interface GUI. The processor is not represented as it can be of implemented in different devices, such as for example client C1.

The cloud deployment system 1 deploys a cloud environment through a network, the cloud environment comprising a plurality of software components. The software components can be any known software component of a cloud environment, such as containers, virtual machines, hypervisors, or any other software components needed to enable a fully operable cloud environment. Software components can be software defined storage components, network components, security components such as firewalls, deployment components. The cloud deployment system 1 can store or know or access a plurality of software components and only deploy a part of this plurality of software components depending on the needs of the users.

The network through which the cloud environment is deployed represented at FIG. 1 comprises two clients C1 and C2, which can be any device to access a cloud environment, for example a computer, a mobile device etc. and three hosts H1, H2 and H3. The three hosts H1 to H3 are network components, such as computers, servers, computing nodes, storage nodes, or any other type of network component able to host at least part of the software components of the cloud environment. Therefore, when the cloud environment is fully deployed, the clients C1 and C2 can access data, or perform any expected tasks using the software component, at least part of which being hosted by at least one of the hosts H1 to H3.

The cloud deployment system 1 comprises a graphical user interface GUI to enable a user to enter data, which will then be stored in the configuration management database DB1. The graphical user interface GUI can be of any type. For example, it can be an online web page, a locally hosted web page, it can be presented via an application. One or more embodiments of the invention may incorporate any way of retrieving data from a user by presenting the user at least one request or at least one data field on a screen.

The cloud deployment system 1 comprises a configuration management database DB1. Such database DB1 can be of any type, such as an SQL database, a noSQL database, or any other type of known database. The database DB1 is accessible a plurality of times, so as to retrieve data and to store data. Preferably, the database is accessed through a RESTful (Representational state transfer) API (Application Programming Interface), that is any API that adheres to the REST architectural constraint, or through any other type of API. The configuration management database DB1 stores installation data I, also referred to as configuration data, for the plurality of software components that can be deployed by the system 1. It has to be noted that not all software components that can be deployed are necessarily deployed. This depends on the needs of the users and the data entered at the first step of the method according to one or more embodiments of the invention. The installation data I or configuration data refer to data that are needed for the installation of a particular software component or for its configuration after it has been installed or built.

The cloud deployment system 1 also comprises an orchestrator, O1, a module configured to define a sequence of build of software components. The orchestrator O1 can for example be a combination of an Ansible® Tower workflows and job templates, but it can also be built based on any orchestration tool known or from scratch.

The cloud deployment system 1 also comprises a processor, not represented. The processor is configured to carry out at least several steps of the method of one or more embodiments of the invention. The processor can be comprised in any one of the entities represented at FIG. 1, in several of the entities represented at FIG. 1, or in a standalone device unrepresented at FIG. 1. The cloud deployment system 1 can comprise several processors.

One or more embodiments of the invention permit to deploy an entire cloud environment from a bare metal server (i.e. a server without an operating system or a single tenant server, not shared between users) to a fully deployed cloud environment able to integrate multiple different technology platforms, comprising for example a front-end user portal, and a plurality of other software components such as virtual machines, containers, hypervisors etc.

Figure 2:
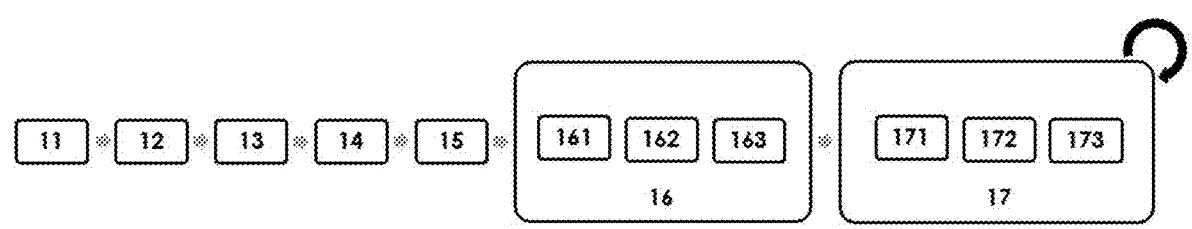
FIG. 2 is a schematic representation of an embodiment of the cloud deployment method according to one or more embodiments of the invention.

A first embodiment of the method according to one or more embodiments of the invention is represented at FIG. 2. The method 10 for the deployment of a cloud environment comprises a plurality of steps.

In a first step 11 of the method 10, a plurality of pieces of data are retrieved from the graphical user interface GUI of the system 1 for the deployment of a cloud environment. In this first step 11, a user enters data via the graphical user interface GUI. The user can be led by the graphical user interface GUI, for example when the graphical user interface GUI comprises requests to enter a type of data. The entered user data, necessary for the method 10, comprise at least one piece of data related to the location of future clients of the cloud environment or of hosts, data related to the subnets of the network via which the cloud environment will be deployed, data related to the network services, data related to the hardware comprised in the network, for example to the hardware which will host the cloud environment or to the hardware which will be used as clients of the cloud environment, data related to security such as the required level of security or any other data related to the security of the future cloud environment. The user data can comprise any data needed to and related to the deployment of the cloud environment. For example, the user data can be a hard coded list of all physical assets, or can allow for a later network discovery based on coded categories, for example which type of device should be treated as a Hypervisor, as Storage etc.

In a second step 12, the retrieved user data is stored in the configuration management database DB1. This step can comprise using an API to access the configuration management database DB1 to store user data. This can be done by having a connection between the client comprising the graphical user interface and the configuration management database DB1. This can also be done using any connection between the graphical user interface GUI and the configuration management database DB1. This step 12 of storing permits to reuse the user data at several times during the deployment process. The transmission of user data from the graphical user interface GUI to the configuration management database DB1 can be performed using instructions stored by a memory of the cloud deployment system 1, the instructions being executed by the processor of the cloud deployment system 1.

In a step 13 of the method 10, a hardware discovery is performed through the network to obtain data related to at least one network host to host at least part of the plurality of software components. The hardware discovery permits to know the hardware accessible through the network and therefore to detect potential hosts for the software components of the cloud environment. The hardware discovery of step 13 can be performed using instructions stored by a memory of the cloud deployment system 1, the instructions being executed by the processor of the cloud deployment system 1. The step 13 of performing a hardware discovery is optional. Instead, the user can enter a hard-coded list of all physical assets of the network or the system can use any other mean to have knowledge of the configuration of the network. Preferably, the step 13 is performed as it enables the user to enter less data.

In a step 14, data related to the network hosts and the software components is generated, at least part of the data being generated randomly. This permits to improve the security of the cloud environment, the user not having knowledge of at least some of the parameters intrinsic to the cloud environment. This step 14 is carried out by the processor of the system 1 and can for example comprise the generation of at least one IP addresses and/or at least one hostname for hosts and/or information about the software components of the cloud system, for example for network components that will host at least part of the software components of the cloud environment or directly for software components. Example of generated software components data can be data related to the active directory such as passwords, user configuration etc.

In a step 15, the retrieved host data and/or the generated data are stored in the configuration management database. This step can comprise using an API to access the configuration management database DB1 to store generated and/or retrieved data. This can be done by having a connection between the processor or the component comprising the processor and the configuration management database DB1. This step 14 of storing permits to reuse the data at several times during the deployment process. The transmission of data from the processor or from a memory of the system 1 to the configuration management database DB1 can be performed using instructions stored by a memory of the cloud deployment system 1, the instructions being executed by the processor of the cloud deployment system 1.

Once all necessary data have been stored in the configuration management database, the process of installing and configuring the software components of the cloud environment launches.

This process comprises a first initial step 16 of deploying the core environment build, for example by deploying a first software component. This first software component is generally a software component that other software components of the cloud environment rely on to be installed or need to execute. For example, in this first step 16, a hypervisor can be deployed on a bare metal server, for example on server host H1. The hypervisor is then needed for other software components such as virtual machines to be deployed.

The step 16 of deploying a first software component of the plurality of software components of the cloud environment comprises three sub-steps.

In a sub-step 161, at least one piece of data of installation data I and user data and/or generated data are retrieved. The installation data I is data relative to the software component. For example, when the software component is a hypervisor, the installation data I can comprise at least one of a server name, IP address, and hypervisor specific configuration such as networking, storage and clustering configuration. The user data refer to the data retrieved from the user and the generated data refer to the data retrieved from the network discovery of step 13 and/or from the generation of data of step 14. The data retrieved at sub-step 161 necessary comprise installation data I and at least one piece of data from user data and/or generated data, if needed. As might be recognized by a man skilled in the art, the retrieved data can comprise any data needed to deploy the software component, from its installation to its configuration and update. This retrieving can comprise the use of an API to access the configuration management database DB1.

In a sub-step 162, the software component is deployed using the retrieved data related to the software component, the deploying comprising at least the installation and configuration of the software component and generating deployment data D related to the deployment of the software component. The generated deployment data D can comprise any data and any kind of data related to the deployment of the software component. For example, deployment data D can comprise of the details of a virtual machine including name, operating system, hardware allocation and network configuration, or the installation of a specific piece of software and its configuration. Deployment data D is preferably data that will be used by other software components when deployed, or for any further use of the deployed software component.

In a sub-step 163, the deployment data D is stored in the configuration management database DB1. This step is preferably carried out by the processor of the system 1 and can use the API to access the configuration management database DB1 to store deployment data D.

A benefit of one or more embodiments of the invention in that it uses data of a previous deployment for the deployment of another software component, dependant on the software component previously deployed, such as virtual machines which depend on the deployment of a hypervisor. This permits to need a limited amount of data from a user and to have a reliable and secure deployed cloud environment.

After the initial deployment step 16, a step 17 is repeated for each of the other software components of the cloud environment. This does not mean that the step 17 is repeated for each of the plurality of components that can be installed using the installation data I of the configuration management database DB1, but that the step 17 is repeated for each of the software components to be deployed to obtain a cloud environment that matches the user needs and the user data retrieved at the first step 11. The step 17 comprises the sub-steps 171 to 173.

In a sub-step 171, at least one piece of data of installation data I and user data and/or generated data are retrieved. As explained before, the installation data I is data relative to the software component, the user data refer to the data retrieved from the user and the generated data refer to the data retrieved from the network discovery of step 13 and/or from the generation of data of step 14. The deployment data D is data generated at the deployment of a previous software component, such as for example the deployment carried out at step 16, for example the deployment of a hypervisor. The data retrieved at sub-step 171 necessary comprise installation data I, deployment data D and at least one piece of data from user data and/or generated data, if needed. For example, to deploy a virtual machine software component on host H1, the IP address, hostname and storage capacity of the host H1, an installation path and data related to a previously deployed hypervisor can be retrieved from the configuration management database DB1. As might be recognized by a man skilled in the art, the retrieved data can comprise any data needed to deploy the software component, from its installation to its configuration and update. This retrieving can comprise the use of an API to access the configuration management database DB1. The deployment can also be performed using a previously deployed software component.

In a sub-step 172, the software component is deployed using the retrieved data related to the software component, the deploying comprising at least the installation and configuration of the software component and generating deployment data D related to the deployment of the software component. The deployment advantageously uses deployment data D from previous deployment(s) of software component(s), so as to have an automatic and reliable deployment, while keeping the deployment secure, the data being generated throughout the deployment method without human intervention. The generated deployment data D can comprise any data and any kind of data related to the deployment of the software component. Deployment data D is preferably data that will be used by other software components when deployed, or for any further use of the deployed software component.

In a sub-step 173, the deployment data D is stored in the configuration management database DB1. This step is preferably carried out by the processor of the system 1 and can use the API to access the configuration management database DB1 to store deployment data D.

The recursiveness of the method 10 permits an automatic and secure deployment, the deployment of a second software component using advantageously the data from the deployment of a first software component.

Figure 4:
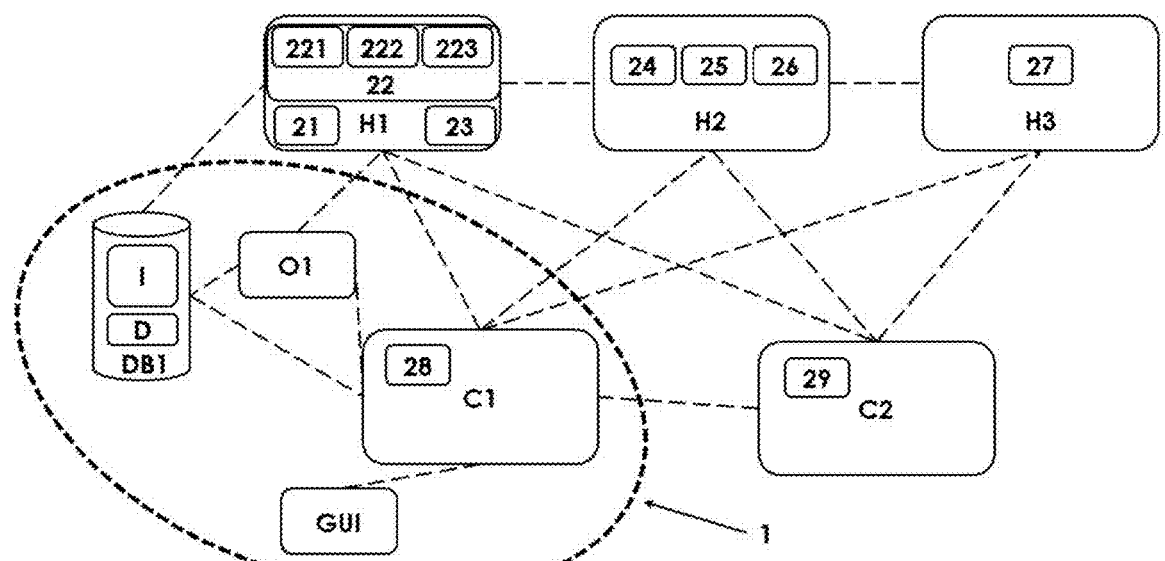
FIG. 4 is a schematic representation of cloud environment deployed with the method and system according to one or more embodiments of the invention.

At the end of the method 10, a fully working cloud environment is built, each software component of the cloud environment having been deployed in a secure and automatic way, as represented at FIG. 4. For example, the cloud environment can comprise a hypervisor 22 running virtual machines 221 to 223 on host H1, while the host H1 can further host two containers 21 and 23 such as Docker® containers. Other software components can be installed on host H2, such as a database dedicated to the cloud environment 24, a cloud billing service 25, and a firewall service 26. The host H3 can host a container orchestration system such as Kubernetes®. The clients C1 and C2 can each host an application that enables access to the cloud environment. These are illustrative embodiments of the invention is in way limited to described software components. Although not represented, one or more embodiments of the invention may also cover software components shared between several hosts and/or clients. One or more embodiments of the invention may also cover any component that has to be deployed to provide a fully working cloud environment, providing for example a CI/CD (continuous integration/continuous development) pipeline, IaaS, PaaS, serverless, Kubernetes clusters, monitoring, reporting and billing, in a secure, fast and reliable fashion.

Figure 3:
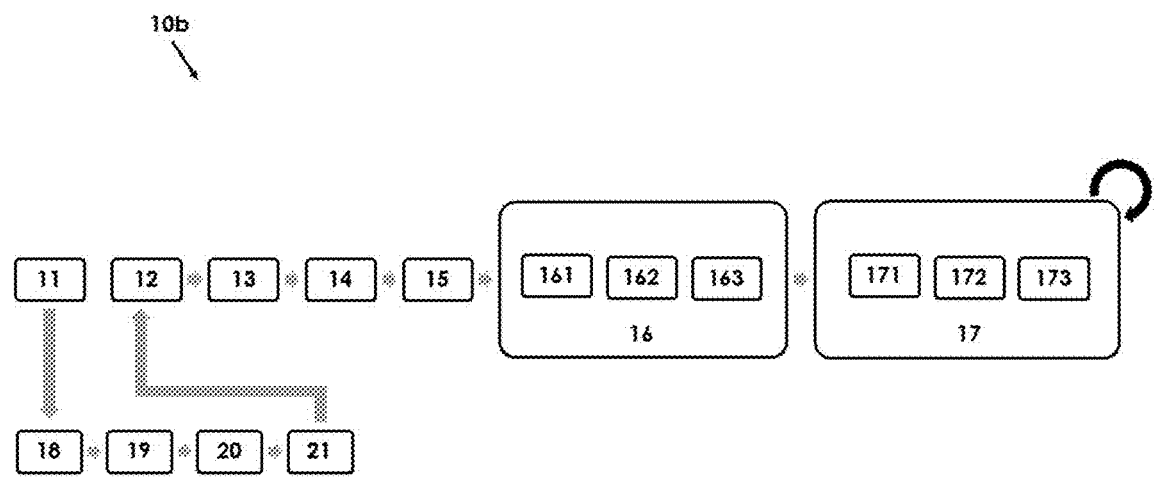
FIG. 3 is a schematic representation of another embodiment of the cloud deployment method according to one or more embodiments of the invention.

In an illustrative embodiment represented at FIG. 3, the method 10b is substantially identical to method 10, but further comprises steps 18 to 21, inserted between steps 11 and 12.

In a step 18, the user data retrieved through the graphical user interface GUI is validated, for example by the processor of system 1 executing instructions stored by a memory of the system 1. The step 18 of validating user data comprises checking that user data verifies predefined rules and correcting parts of user data that do not verify predefined rules. The predefined rules can for example be stored in the configuration management database DB1. This permits to lower user actions in the method 10b.

In a step 19, a global configuration of the cloud environment is created based on the retrieved user data. The global configuration can for example be created using predefined configurations and selecting one of the predefined configurations or can combine predefined configurations or can be created from scratch. The global configuration can for example be created using a hardcoded list of all physical assets entered by the user. The predefined configurations can be stored in the configuration management database DB1, and the step 19 of creating a global configuration can be carried out by the processor of the system 1 executing instructions stored in a memory of the system 1.

In a step 19, the global configuration is used to select which software components to deploy among the plurality software components of the cloud environment. The plurality of selectable software components can be predefined and stored in the configuration management database DB1. The plurality of selectable components can cover very different cloud environments and very different needs. At step 19, a down-selection is carried out to only select the needed software components as a function of user data and of the global configuration created at the step 18. That way, one or more embodiments of the invention may be adaptative, and automatic, and may fit the needs of different users in different organisations.

In a step 20, the orchestrator O1 of system 1 defines a deployment sequence of the selected software components. This permits to define which components to deploy first as a function of their dependencies towards other software components of the cloud environment.

The method according to one or more embodiments of the invention can comprise a last step (not represented) of automatic testing of the deployed cloud environment comprising the deployed software components, the step of testing comprising checking that the deployment verifies predefined rules. This step enables to automatically check that the cloud deployment has been carried out in right conditions and that the cloud environment is fully operable, and further limits the needs of user action.

What is claimed is:

1. A method for deployment of a cloud environment, the cloud environment comprising a plurality of software components deployed through at least one network, the method comprising:
    retrieving user data from at least one user using at least one user interface, wherein the user data comprises a plurality of user pieces of data related to the cloud environment;
    storing the user data in a configuration management database;
    generating generated data related to installation of the plurality of software components and of at least one network host capable of hosting at least part of the plurality of software components,
        wherein at least part of the generated data is generated randomly,
            wherein, for said generated data related to said at least one network host, said generated data comprises
                an IP address of said at least one network host; and
                a hostname of said at least one network host; and wherein, for said generated data related to at least one software component, said generated data comprises data relative to an active directory, comprising
a password;
a user configuration;
storing the generated data in the configuration management database,
wherein the generated data is generated and stored before deploying the plurality of software components;
retrieving first component data related to a first software component of the plurality of software components from the configuration management database,
wherein the first software component is a software component that other software components rely on to be installed or need to execute,
wherein the first component data comprises
installation data related to the first software component;
at least one user piece of data from the user data; and
at least a portion of the generated data;
deploying the first software component using the first component data related to the first software component, the deploying comprising
installing and configuring the first software component; and
generating first deployment data related to deployment of the first software component;
storing deployment data comprising the first deployment data in the configuration management database;
for each software component of the plurality of software components other than the first software component,
retrieving component data related to said each software component from the configuration management database, the component data comprising
at least one user piece of data from the user data;
at least a portion of the generated data;
deployment data generated at the deployment of a previous software component, comprising said first software component; and
deploying said each software component using the component data related to said each software component and said deployment data, the deploying comprising
installing and configuring said each software component; and
generating new deployment data related to the deployment of said each software component; and,
storing the new deployment data with the deployment data of the configuration management database.

2. The method according to claim 1, further comprising performing a hardware discovery through the at least one network to obtain data related to the at least one network host prior to generating the generated data related to the at least one network host.

3. The method according to claim 1, wherein the plurality of software components are grouped in deployment groups; and,
said deploying said each software component comprises deploying a deployment group of said deployment groups that comprises said each software component.

4. The method according to claim 3, wherein said deployment groups are based on types of said plurality of software components.

5. The method according to claim 1, wherein software components of the plurality of software components are selected from virtual machine components, hypervisor components, software defined storage components, network components, security components, deployment components.

6. The method according to claim 1, wherein the user data comprises one or more of location, subnet, network services, hardware, security.

7. The method according to claim 1, further comprising creating a global configuration of the cloud environment based on the user data, after said retrieving said user data;
selecting which software components of said plurality of software components to deploy based on said global configuration;
obtaining a deployment sequence of the selected software components from an orchestrator.

8. The method according to claim 1, further comprising validating the user data after retrieving user data, comprising
checking that the user data verifies predefined rules; and,
correcting parts of user data that do not verify the predefined rules.

9. The method according to claim 1, further comprising testing the cloud environment after deployment of the cloud environment, comprising checking that the cloud environment verifies predefined rules.

10. The method according to claim 1, wherein the method is performed using a deployment system comprising
said at least one user interface;
said configuration management database;
at least one orchestrator module, configured to define a sequence of deployment of the plurality of software components; and
at least one processor, configured to perform
said generating generated data;
said retrieving component data related to said each software component; and,
said deploying said each software component.

11. The method according to claim 10, wherein the at least one processor is further configured to validate the user data.

12. The method according to claim 10, wherein the at least one processor is further configured to select, based on the user data, which software components to deploy among the plurality software components of the cloud environment.

13. The method according to claim 1, wherein the method is performed using a program executed by a computer.

14. The method according to claim 1, wherein the method is performed using instructions stored on a computer-readable medium, wherein said instructions are executed by a computer.

* * * * *